United States Patent [19]

Tsuzuki

[11] Patent Number: 5,007,045
[45] Date of Patent: Apr. 9, 1991

[54] INTEGRATED COMMUNICATIONS SYSTEM FOR HDLC VARIABLE-LENGTH DATA PACKETS AND FIXED-LENGTH VOICE/VIDEO PACKETS

[75] Inventor: Kazuo Tsuzuki, Tokyo, Japan
[73] Assignee: NEC Corporation, Tokyo, Japan
[21] Appl. No.: 475,484
[22] Filed: Feb. 5, 1990

[30] Foreign Application Priority Data

Feb. 3, 1989 [JP] Japan ............................... 1-24868

[51] Int. Cl.⁵ ............................................... H04J 3/24
[52] U.S. Cl. .................................... 370/94.10; 370/60; 370/16
[58] Field of Search ...................... 370/60, 94.1, 85.12

[56] References Cited

U.S. PATENT DOCUMENTS

| | | | |
|---|---|---|---|
| 4,410,889 | 10/1983 | Bryant et al. | 370/94.1 |
| 4,412,326 | 10/1983 | Limb | 370/94.1 |
| 4,872,160 | 10/1989 | Hemmady et al. | 370/60 |
| 4,885,744 | 12/1989 | Lespagnol et al. | 370/94.1 |
| 4,922,486 | 5/1990 | Lidinsky et al. | 370/94.1 |
| 4,926,420 | 5/1990 | Shimizu | 370/94.1 |

Primary Examiner—Douglas W. Olms
Assistant Examiner—Dang Ton
Attorney, Agent, or Firm—Sughrue, Mion, Zinn, Macpeak & Seas

[57] ABSTRACT

In an integrated communications system, HDLC variable-length packets and non-HDLC fixed-length packets are decomposed into cells and a cell identifier is generated for each of the cells for identifying its type. A frame sync code is transmitted from one end of a transmission channel, and the cell identifier and each of the cells are assembled into a field and a plurality of such fields are assembled into a frame for transmission. The frame sync code is detected at the other end of the transmission channel as a timing reference and the frame is deassembled into fields in response to the timing reference and each field is deassembled into a cell identifier and a cell. According to each deassembled cell identifier, the cells of each field are composed into the original HDLC variable-length packet of non-HDLC fixed-length packet.

11 Claims, 7 Drawing Sheets

INTEGRATED COMMUNICATIONS SYSTEM FOR HDLC VARIABLE-LENGTH DATA PACKETS AND FIXED-LENGTH VOICE/VIDEO PACKETS

TECHNICAL FIELD

The present invention relates generally to a communications system which integrates signals of different formats, and more particularly to a communications system which integrates HDLC (high level data link control) variable-length data packets with non-HDLC fixed-length packets. The HDLC packet is transmitted according to the CCITT (International Telegraph and Telephone Consultative Committee) Recommendation X.25 protocol which involves packet retransmission for error correction, while the non-HDLC fixed-length packets such as voice and/or video packets are transmitted involving no packet retransmission in the event of an error.

BACKGROUND OF THE INVENTION

In a prior art integrated communication system in which HDLC X.25 computer data packets and fixed-length voice/video packets are transmitted over a common transmission medium, the fixed-length packets are transformed into the HDLC format and a specified identifier is inserted into the address or control field of the transformed packets so that both types of packets are treated at the receive end as variable-length packets. Because of the adoption of the HDLC format for mixing the different formats, the prior art system employs what is called "zero-insertion and zero-deletion" scheme by forcibly inserting a 0 bit if there is a string of five consecutive 1 bits at the transmit end and removing it at the receive end to allow transmission of a flag pattern "01111110" as a delimiter of the variable-length packet.

However, if disruption occurs in a received data stream causing an error in the inserted 0 bit, the packet containing this error bit is aborted. Otherwise, such a packet propagates along the network as a truncated, short packet or merges with a preceding packet resulting in a long packet. In either case, the packet is detected as an error by a frame check sequence and is eventually discarded. If an error occurs in X.25 HDLC packet, it can be corrected by the packet retransmission scheme, whereas voice/video packets in error are simply discarded. The potential source of this type of error is the bit reversal of the forcibly inserted 0 bit in the voice/video packet. Such irrecoverable errors can occur at 2.1-second intervals for a transmission rate of 1.5 Mbps at a bit error rate of $10^{-5}$. One approach to this problem is to append an error correcting code to fixed-length packets. However, since the beginning and ending points of such packets cannot be guaranteed with a high degree of certainty, the error correcting code approach serves no purpose. Another approach would be to employ a retransmission scheme as in the case of the X.25 packets. However, the real-time transmission requirement of the voice/video packet cannot be met by the retransmission scheme.

SUMMARY OF THE INVENTION

It is therefore an object of the present invention to provide an integrated communications system for HDLC variable-length data packets and non-HDLC fixed-length voice/video packets which is capable of significantly reducing the error rate of the non-HDLC packets.

According to the present invention, HDLC variable-length packets and non-HDLC fixed-length packets are decomposed into one or more cells and a cell identifier is generated for each of the cells for identifying a type of the packet from which said cell is decomposed. A frame sync code is transmitted from one end of a common transmission medium, and the cell identifier and each of the cells are assembled into a field and a plurality of such fields are assembled into a frame, which is transmitted through the transmission medium. The frame sync code is detected at the other end of the transmission medium as a timing reference and the frame is deassembled into fields in response to the timing reference. Each of the fields is deassembled into a cell identifier and a cell. According to each deassembled cell identifier, the cells of each field are composed into the original HDLC variable-length packet or non-HDLC fixed-length packet.

More specifically, the present invention provides an integrated communications system. The transmit end of the system comprises an HDLC variable-length packet transmitter and a non-HDLC fixed-length packet transmitter. A shift register is provided having an input terminal connected to the packet transmitters and an output terminal connected to one end of a transmission medium. A sync generator supplies a sync code to the shift register at periodic intervals. A cell formatter activates for a predetermined period one of the packet transmitters having a packet to transmit so that a portion of the packet is supplied to the shift register as a cell. The cell formatter causes a head generator to supply a cell identifier identifying a type of the packet from which said cell is decomposed to the transmit shift register to form a field with the cell, and causes the shift register to assemble the sync code and a plurality of fields into a frame for transmission. At the receive end of the system, a shift register is provided having an input terminal connected to the transmission medium. A sync detector detects the sync code contained in the frame supplied to the shift register. A header detector is responsive to a sync code detected by the sync detector for detecting the cell identifier of each field of the frame. An HDLC variable-length packet receiver and a non-HDLC fixed-length packet receiver are provided. A cell deformatter is responsive to the cell identifier detected by the header detector for activating one of the packet receivers identified by the detected cell identifier so that each cell is supplied from the shift register to the identified packet receiver where the cells are composed into the original packet.

BRIEF DESCRIPTION OF THE DRAWINGS

The present invention will be described in further detail with reference to the accompanying drawings, in which.

DETAILED DESCRIPTION

Figure 1:
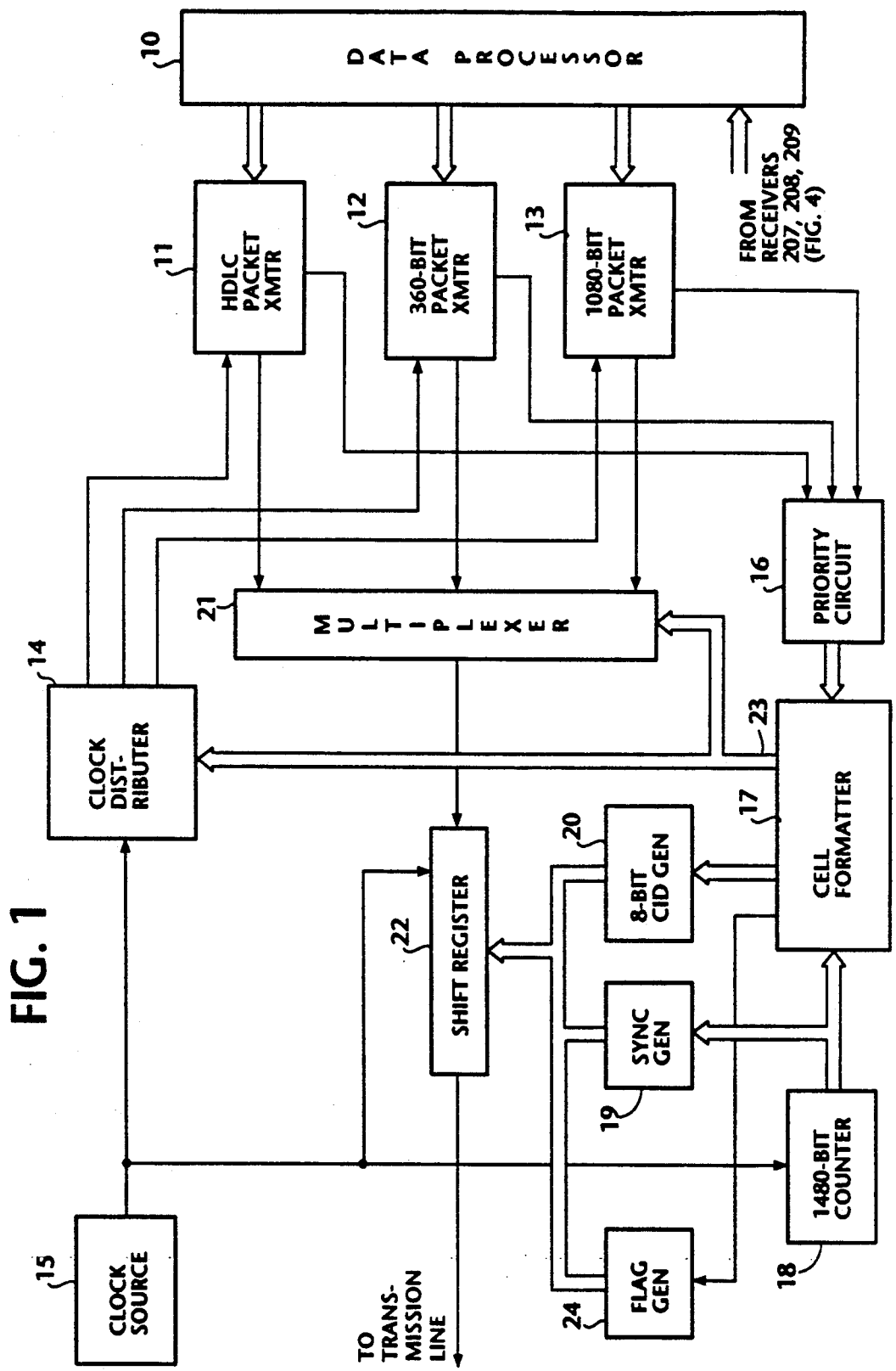
FIG. 1 is a block diagram of a transmit section of the integrated communications system of the present invention.

Referring now to FIG. 1, there is shown a transmit section of the integrated communications system of the present invention. According to this invention, variable-length packets such as X.25-protocol HDLC data packets and fixed-length voice or video packets such as 360-bit length or 1080-bit length are decomposed into segments of 360-bit length each, which are referred to in this specification as "cells." Four such cells are interleaved with 8-bit cell identifier, or cell identifiers (CID) to form "fields" which are encapsulated between 8-bit sync fields, instead of the usual "01111110" flag patterns, to form a 1480-bit length frame. The HDLC packets and the variable length packets are shown as being generated by a processor 10 and supplied to respective packet transmitters 11, 12 and 13 for transmission to a destination processor, not shown. Packet transmitters 11, 12 and 13 are provided with respective memories for storing the generated packets, each of these memories being driven by a sequence of 360 clock pulses which is extracted by a clock distributer 14 from a continuous stream of clock pulses supplied from a clock source 15.

If there is a packet to transmit, packet transmitters 11, 12 and 13 place a request for transmission through respective lines 11A, 12A, 13A to a priority circuit 16 which selects one of the requests according to a predetermined decision algorithm if a plurality of requests exist simultaneously. The type of a packet selected by priority circuit 16 is notified to a cell formatter 17. The clock pulse from source 15 is supplied to a 1480-bit counter 18 to cause it to supply timing information to cell formatter 17 and to a sync generator 19 which generates an 8-bit frame sync at intervals of 1480 bits and writes it into a shift register 22 which is shifted at the clock rate.

An 8-bit cell identifier generator 20 is provided for writing an 8-bit cell identifier (CID) into shift register 22 at 368-bit intervals in response to a control signal supplied from cell formatter 17. The 8-bit cell identifier of each cell indicates the type of the packet from which the cell is derived. The cell identifier is a block code encoded with error correcting bits. To allow detection and correction of errors, the Hamming distance of 3 bits or more is secured between cell identifiers. Four cell identifiers are provided: CID="0" (which is encoded as "10101001") identifying cells derived from the HDLC packet, CID="1" ("11010100") identifying cells derived from the 360-bit fixed-length packet, CID="2" ("01011011") identifying each of the first and second cells of the 1060-bit fixed length packet, and CID="3"("00100110") identifying the third cell of the 1060-bit packet.

Figure 2A:
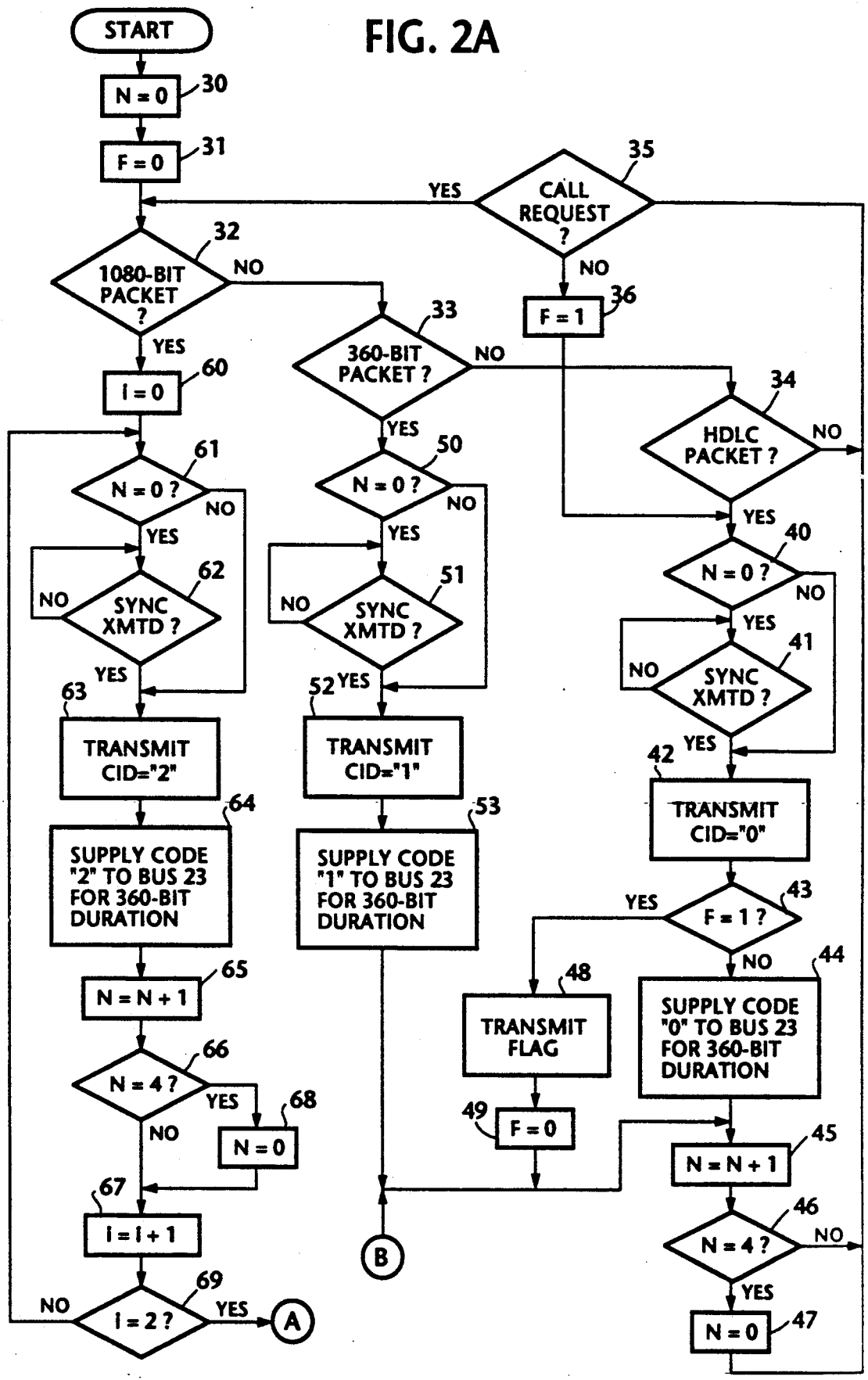
FIGS. 2A and 2B are a flowchart illustrating details of the cell formatter of FIG. 1.
Figure 2B:
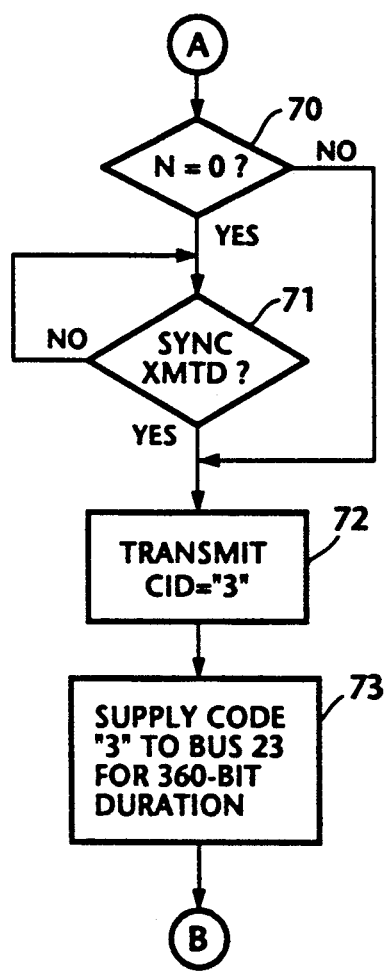

Cell formatter 17 further controls clock distributer 14 and a multiplexer 21 through bus 23. Multiplexer 21 terminates the data outputs of packet transmitters 11, 12 and 13 for selectively coupling cell data bits to the shift register 22. A flag generator 24 is also connected to respond to a signal from cell formatter 17 to write a flag sequence "01111110" into shift register 22 when no data packet is present. The details of cell formatter 17 are shown in the flowchart of FIGS. 2A and 2B.

Figure 3A:
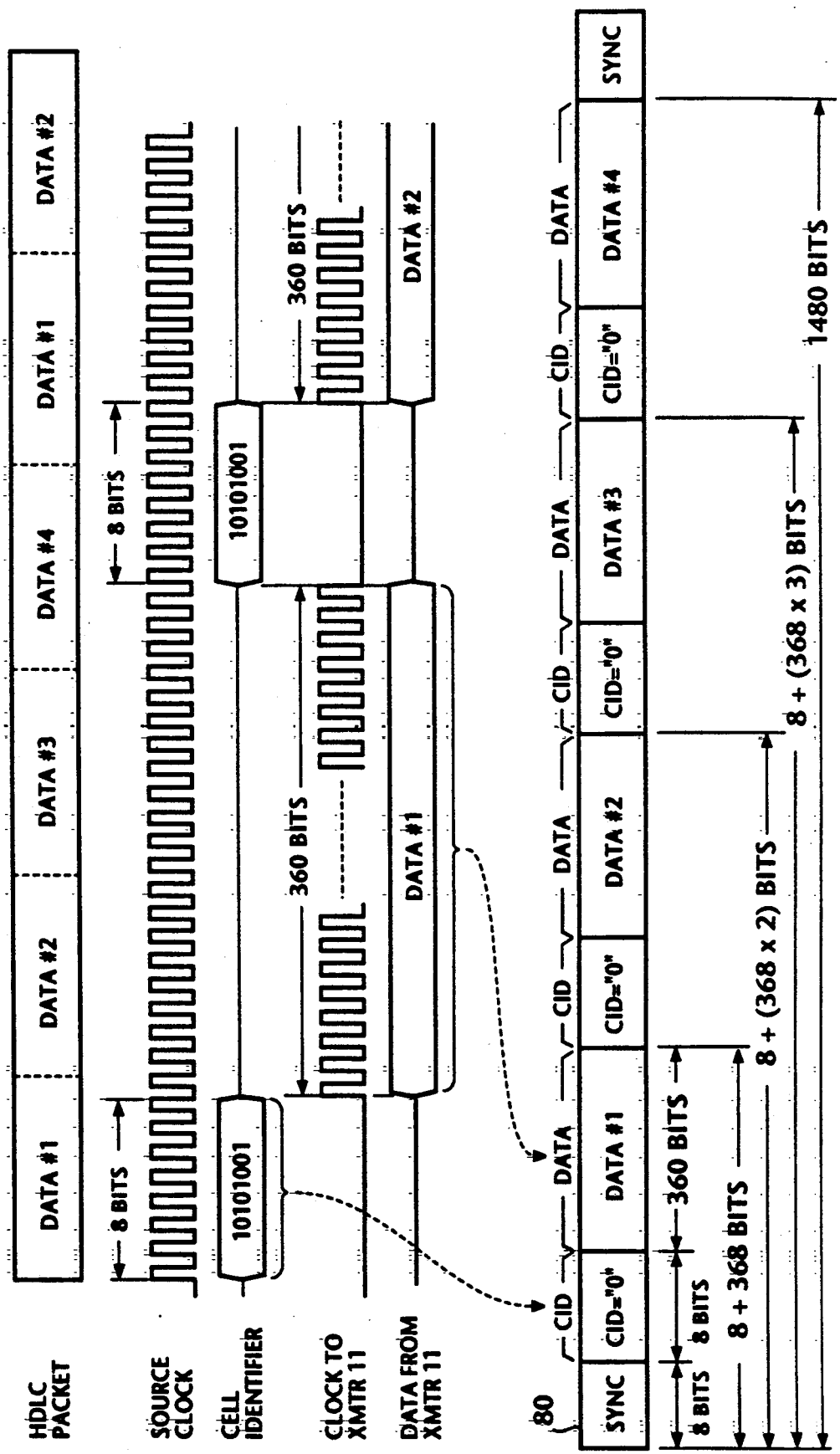
FIGS. 3A, 3B and 3C are timing diagrams for generating frames respectively for HDLC, 360-bit and 1080-bit packets.

Program execution begins with initializing steps 30 and 31 to reset variables N and F to zero, where variable N represents the serial number of each cell in a given frame and F=1 indicates that there is no call request in any of packet transmitters. Control then enters a search loop comprising steps 32, 33, 34 and 35 for detecting whether there is a call request, and if so which one of the packet transmitters is requesting the call. If a call is requested by HDLC packet transmitter 11, control passes through steps 32, 33, 34 and enters step 40 to check to see if a variable N is equal to zero or not. If the answer is affirmative, exit is to step 41 to wait until a sync code is transmitted, and if the answer is negative, exit is to step 42 to supply a cell identifier code CID="0" to the 8-bit CID generator 20 to cause it to write an 8-bit cell identifier "10101001" into shift register 22 at the clock count of (8+368 N) bits. Thus, cell identifiers of each frame are successively transmitted at clock counts of 8, 376, 744, and 1112 bits, respectively, following the transmission of a frame sync 80 generated by sync generator 19 (FIG. 3A). Following the transmission of a cell identifier, control proceeds to decision step 43 to determine if F=1 exists. If there is none, control proceeds to step 44 to supply the CID="0" code to bus 23 for a period of 360 clock bits. In response to CID="0", clock distributer 14 establishes a path leading to the HDLC packet transmitter 11 for a 360-bit duration to supply 360 clock pulses to HDLC packet transmitter 11. Concurrently, multiplexer 21 responds to CID="0" by establishing a path from HDLC packet transmitter 11 to shift register 22 during the same duration. HDLC packet transmitter 11 is driven by the clock pulses from distributer 14 to supply cell data #1 from its memory to shift register 22.

Exit then is to step 45 in which the variable N is incremented by one. Variable N is checked in step 46 to see if N=4, or not. If not, control returns to the search loop to repeat the process so that, as long as a call request from HDLC packet transmitter 11 is present, succeeding cell data #2, #3 and #4 of the HDLC packet are sequentially delivered from HDLC packet transmitter 11 to shift register 22, respectively following cell identifiers CID="0" The transmission of a 1480-bit frame of HDLC data completes when N becomes equal to 4. When decision in step 46 goes affirmative, exit is to step 47 which resets N to zero so that control is caused to delay the transmission of the CID of first occurrence in each frame by step 41 until a frame sync is transmitted.

Figure 3B:
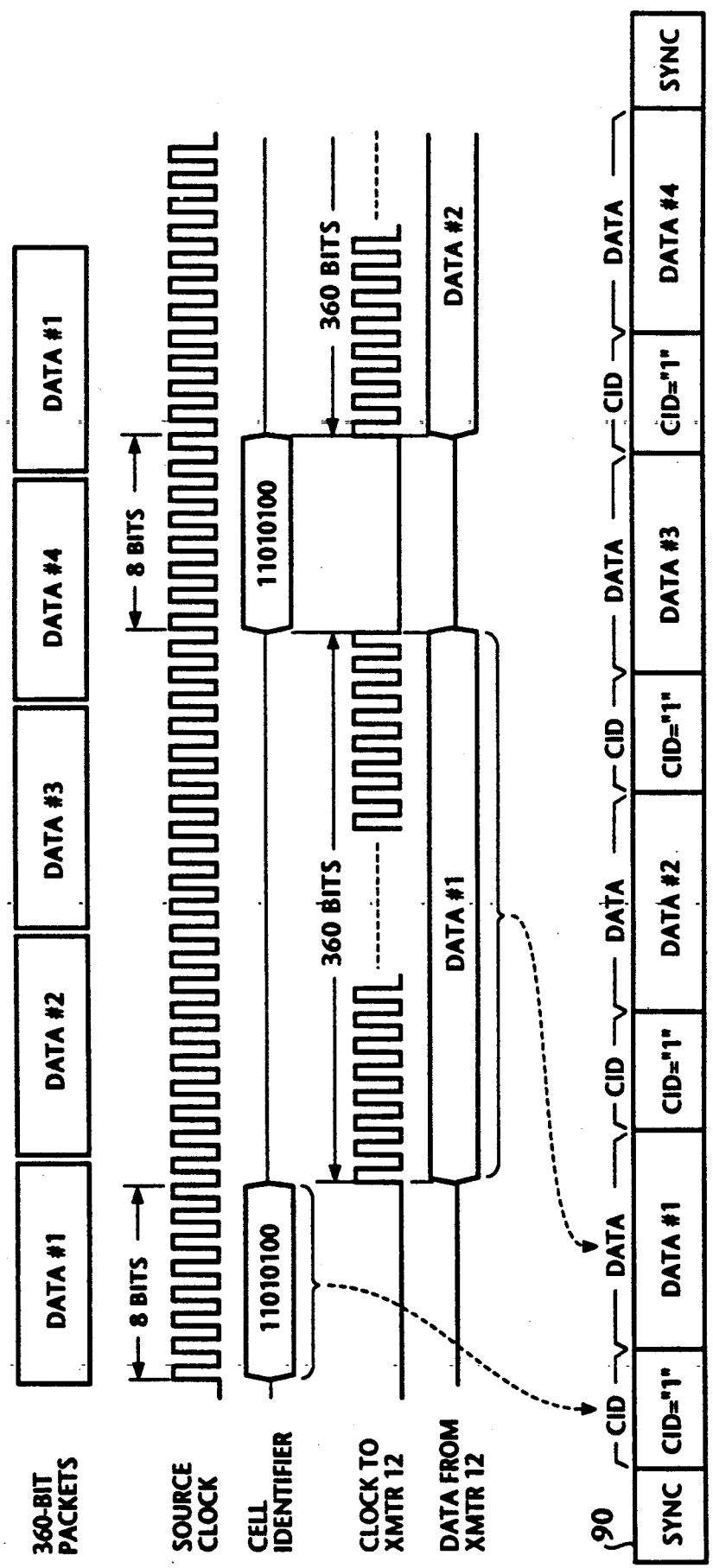

If a call is requested from 360-bit packet transmitter 12, control exits the search loop and enters a subroutine comprising steps 50 to 52 which are respectively similar to steps 40 to 42 just described, with the exception that in step 52 cell identifier CID="1" is supplied to CID generator 20. Control advances to step 53 to supply the code CID="1" to bus 23 for a 360-bit duration. Therefore, an 8-bit cell identifier "11010100" is written into shift register 22, following a frame sync code 90 (FIG. 3B). In response to CID="1", clock distributer 14 establishes a path leading to the 360-bit packet transmitter 12 to drive it for a 360-bit duration. Concurrently, multiplexer 21 responds to CID="1" by establishing a path from 360-bit packet transmitter 12 to shift register 22. Step 53 is followed by steps 45 to 47 as in the case of HDLC packets to repeat the transmission of succeeding cell data. If several 360-bit packets exist as shown in FIG. 3B, steps 50 to 53 are repeatedly executed until N=4 is obtained in step 46.

Figure 3C:
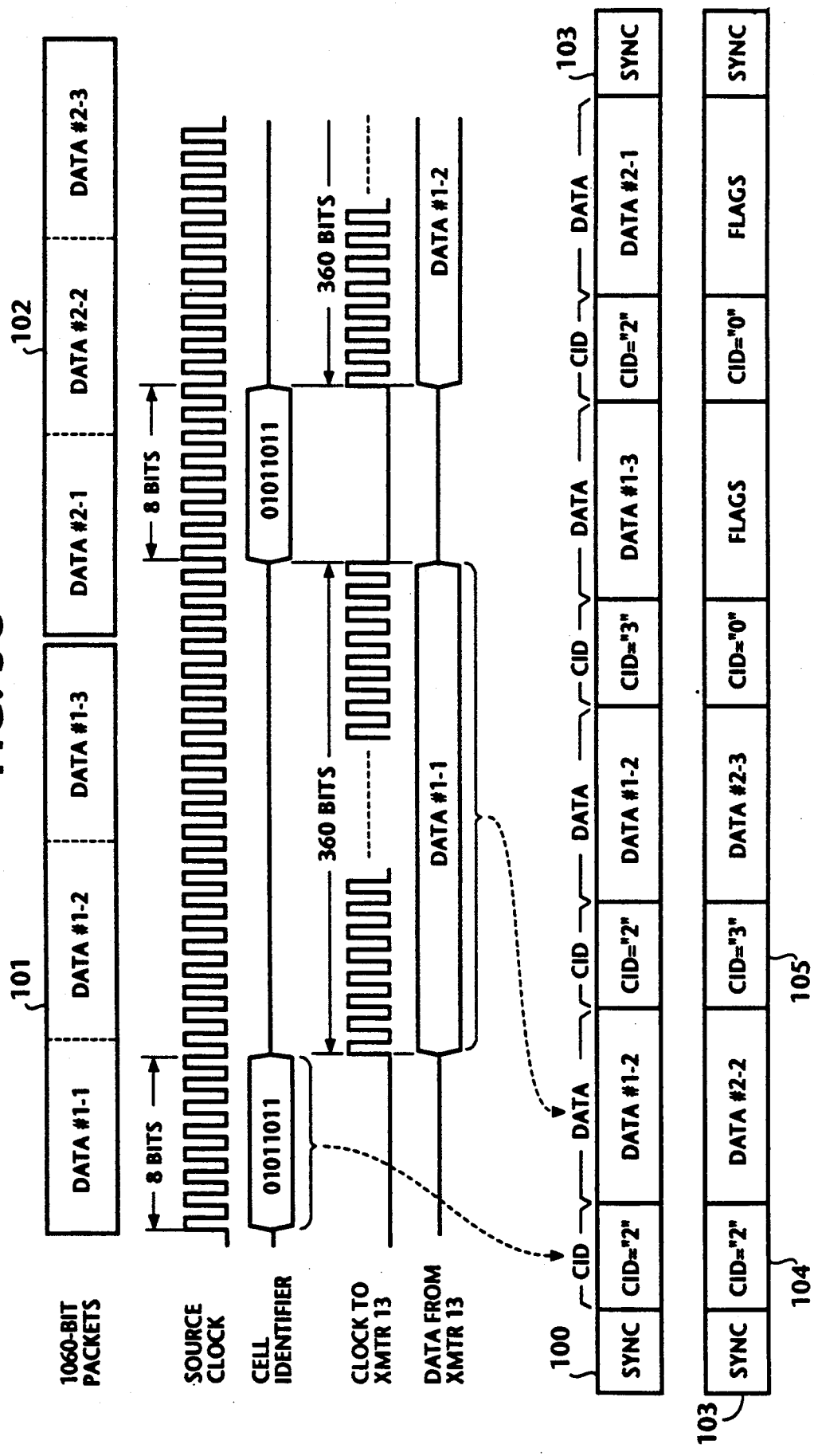

If 1080-bit packet transmitter 13 has two 1080-bit packets 101 and 102 to transmit, for example (see FIG. 3C), control enters step 60 to reset a variable i to zero. Step 60 is followed by steps 61 to 64 which are similar to steps 50 to 53, respectively, with the exception that in step 63 cell identifier code CID="2" is supplied to CID generator 20 and in step 64 the code CID="2" is supplied to bus 23 for a 360-bit duration. Therefore, an 8-bit cell identifier "01011011" is written into shift register 22, following a frame sync code 100 (FIG. 3C). In response to cell identifier code CID="2", clock distributer 14 establishes a path leading to the 1080-bit packet transmitter 13 to drive it for a 360-bit duration. Concurrently, multiplexer 21 responds to code CID="2" by establishing a path from 1080-bit packet transmitter 13 to shift register 22. In this way, a cell identifier CID="2" and cell data #1—1 of 1060-bit packet 101 are successively transmitted.

Step 64 is followed by step 65 which increments the variable N by one. Variable N is checked in step 66 to see if N=4, or not. If N is not equal to 4, control advances to step 67 to increment the variable i by one, and if N=4, exit is to step 68 to reset the variable N to zero before executing step 67. Following step 67, step 69 is executed by determining if i=2. If not, control returns to step 61 to repeat the process so that cell data #1-2 of 1080-bit packet 101 is transmitted following a cell identifier CID="2." After transmission of two cell data preceded by cell identifiers CID="2", variable i has been incremented to 2, and control exits from step 69 and enters steps 70 to 73 which are similar to steps 61 to 64 with the exception that in step 72 cell identifier code CID="3" is supplied to CID generator 20 and in step 64 code CID="3" is supplied to bus 23 for 360-bit duration. Therefore, an 8-bit cell identifier "00100110" is written into shift register 22, following cell data #1-2. In response to CID="3", clock distributer 14 maintains the previous path leading to the 1080-bit packet transmitter 13 to drive it for a 360-bit duration. Concurrently, multiplexer 21 responds to CID="3" by maintaining the previous path from 1080-bit packet transmitter 13 to shift register 22. In this way, a cell identifier CID="3" and cell data #1-3 of 1060-bit packet 101 are successively transmitted.

Exit from step 73 is to steps 44 to 46. Variable N is incremented and checked for N=4. After transmission of the 1080-bit packet 101, N=3 is obtained and control exits from step 45 and reenters the search loop to detect whether a call request is still present. Since the 1080-bit packet 102 is waiting in transmitter 13 to be processed, steps 60 to 69 are looped twice for transmitting cell data #2-1 and #2—2 of packet 102 and steps 70 to 74 are executed once for transmitting cell date #-3 of the, packet. Because N=3 at the instant cell data #2-1 is transmitted, step 62 is skipped in the first pass, but because of the subsequent increment in step 65 to N=4, step 62 is executed in the second pass to allow for insertion of a frame sync 103 before transmitting a cell identifier 104 which precedes cell data #2—2. Execution of steps 70 to 73 follows to sequentially transmit a cell identifier 105 and cell data #2-3 of packet 102.

If there is no call request, control leaves the search loop and enters step 36 to set variable F to 1 and proceeds through steps 40 to 42 to transmit a or cell identifier CID="0" and exits from step 43 to step 48 to cause flag generator 24 to write a cyclic pattern of flag sequences "01111110" into shift register 22. Exit then is to step 49 to reset variable F to 0, which is followed by step 45. Therefore, if there is no packet to transmit following the transmission of the second 1080-bit packet 102, flag sequences are transmitted respectively preceded by cell identifiers identical to those preceding the cell data of HDLC packets.

It will be seen from the above that the segmented 360-bit cell data of different types of packet can be transmitted continuously by allowing them to be encapsulated between frame sync codes.

Figure 4:
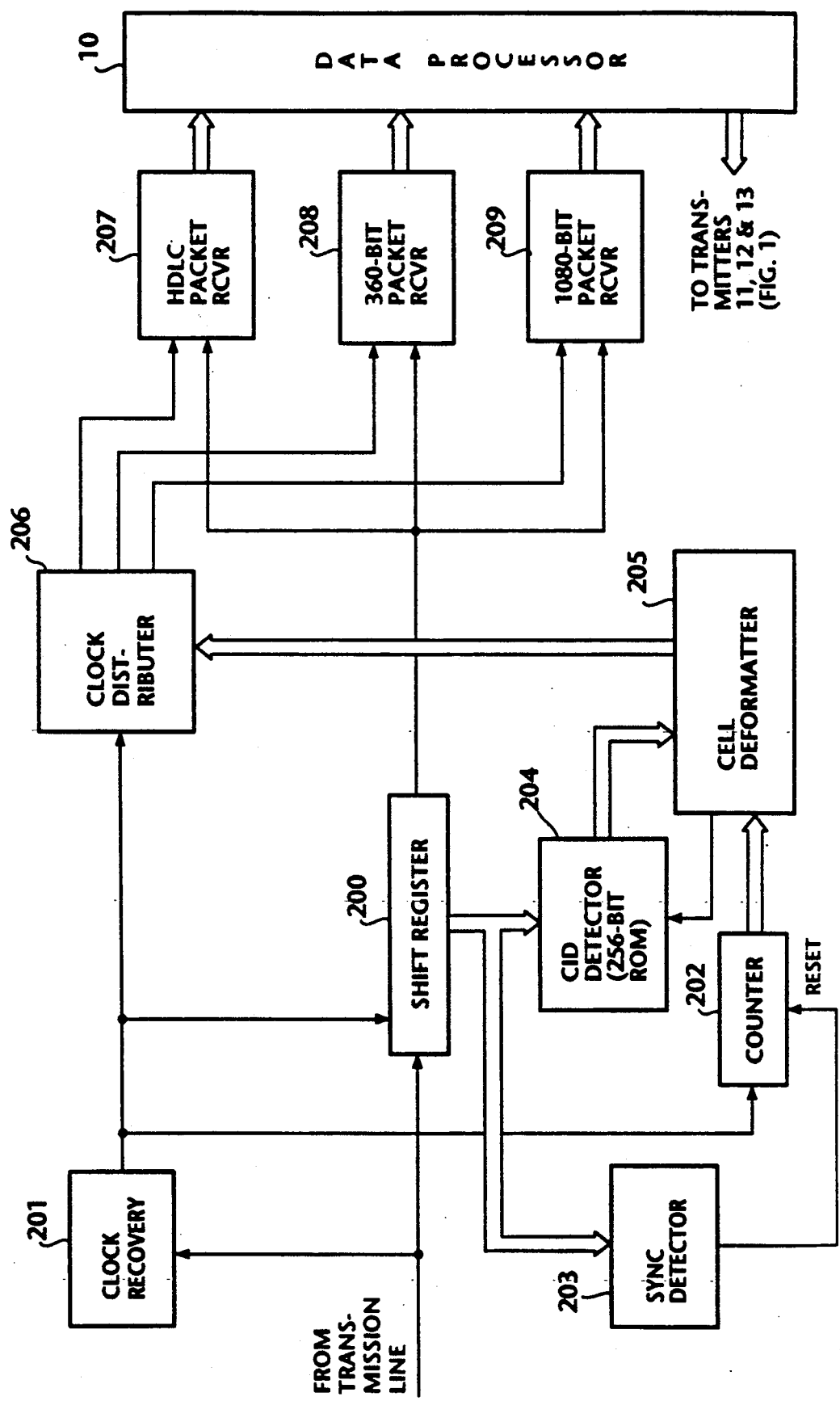
FIG. 4 is a block diagram of a receive section of the system.

FIG. 4 is a block diagram of a receive section of the integrated communications system of the present invention. The cell-formatted data stream is clocked into a shift register 200 by a clock recovery circuit 201, which also drives a clock counter 202. Shift register 200 supplies its contents in parallel form to a sync detector 203 and a cell identifier detector 204. On detecting each sync, sync detector 203 resets the clock counter 202. The CID detector 204 comprises a 256-bit read-only memory having an 8-bit address input. The ROM 205 stores 256 possible binary states. Since the cell identifier is an 8-bit block code with a Hamming distance of 3 bits or more, two-bit errors in the received block code can be corrected in the ROM 205 by translating the corrupted 8-bit cell identifier to an original 8-bit code.

A cell deformatter 205 provides deformatting control over the received data according to a clock count supplied from counter 202. In response to predetermined clock counts, cell deformatter 205 enables the CID detector 204 to read out a two-bit cell identifier code into cell deformatter 205. In response to a read cell identifier, cell deformatter 205 supplies a code to a clock distributer 206 in a manner similar to the transmit section of the system so that clock pulses of 360-bit duration from clock recovery circuit 201 are supplied to one of HDLC packet receiver 207, and 360-bit and 1080-bit packet receivers 208 and 209 to selectively receive cell data from the output of shift register 200. Each of the packet receivers assembles the cell data into the original packet format for coupling to the data processor 10.

Since the fixed-length packets are not converted into HDLC format, data preceded by cell identifiers CID="1", "2" and "3" are not aborted even if they are corrupted. Instances in which data is aborted due to reversal of an inserted zero bit occur only with respect to HDLC data, i.e., data sent with cell identifier CID="0." The rate of fixed-length data being discarded as an error can therefore be significantly reduced in comparison with the prior art system.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A method for transmitting HDLC (high level data link control) variable-length packets and non-HDLC fixed-length packets over a common transmission medium, wherein each of said variable-length and fixed-length packets is composed of one or more cells, comprising:

(a) decomposing each of said HDLC variable-length packets and each of said non-HDLC fixed-length packets into one or more cells;

(b) generating a cell identifier for each of said cells, said cell identifier identifying a type of the packet from which said cell is decomposed;

(c) transmitting a frame sync code from one end of said transmission medium;

(d) generating a frame comprising a plurality of fields each containing said cell identifier and each of said cells and transmitting the frame through said transmission medium;

(e) detecting said frame sync code at the other end of said transmission medium as a timing reference and deassembling said frame into the fields in response to said timing reference;

(f) deassembling each of the fields into a cell identifier and a cell; and (g) composing the deassembled cells into the original HDLC variable-length packet or non-HDLC fixed-length packet according to the deassembled cell identifier.

2. A method as claimed in claim 1, wherein said cell identifier is a block code comprising cell identification bits and error correcting bits, wherein the step (f) comprises correcting error contained in said cell identification bits of each cell identifier using the error correcting bits of the cell identifier.

3. An integrated communications system comprising:
an HDLC (high level data link control) variable-length packet transmitter;
a non-HDLC fixed-length packet transmitter;
a transmit shift register having an input terminal connected to said packet transmitters and an output terminal connected to one end of a transmission medium;
a sync generator for supplying a sync code to said transmit shift register at periodic intervals;
a header generator;
cell formatting means for activating for a predetermined period one of said packet transmitters having a packet of one of variable length and fixed length to transmit so that a portion of said packet is supplied to said transmit shift register as a cell, causing said header generator to supply a cell identifier identifying a type of the packet from which said cell is decomposed to said transmit shift register to form a field with said cell, and causing said transmit shift register to assemble said sync code and a plurality of said fields into a frame and transmitting the frame through said transmission medium;
a receive shift register having an input terminal connected to the other end of said transmission medium, said receive shift register being supplied with said transmitted frame;
a sync detector for detecting the sync code contained in the frame supplied to said receive shift register;
a header detector responsive to the detection of a sync code by said sync detector for detecting the cell identifier of each field of the frame in said receive shift register;
a HDLC variable-length packet receiver;
a non-HDLC fixed-length packet receiver; and
cell deformatting means responsive to the cell identifier detected by said header detector for activating for said predetermined period one of said packet receivers so that said portion of said packet is supplied from said receive shift register to said one of the packet receivers.

4. An integrated communications system as claimed in claim 3, wherein said cell formatting means assembles cells from said HDLC variable-length packet transmitter with cells from said non-HDLC fixed-length packet transmitter in a common frame.

5. An integrated communications system as claimed in claim 3, wherein said cell identifier is encoded with error correcting bits, wherein said header detector corrects an error contained in said cell identifier using said error correcting bits.

6. An integrated communications system as claimed in claim 3, wherein said header detector comprises a memory for storing $2^n$ bits, where n indicates a total number of bits contained in said cell identifier and reading one of said stored $2^n$ bits in response to said cell identifier.

7. An integrated communications system as claimed in claim 3, further comprising a flag generator for generating a predetermined bit pattern, wherein said cell formatting means causes said flag generator to supply said bit pattern to said transmit shift register as a cell in the absence of a packet to transmit in any of said packet transmitters.

8. An integrated communications system as claimed in claim 3, wherein said non-HDLC fixed-length packet transmitter comprises:
a short-length packet transmitter for transmitting a short packet having a length equal to the length of said cell; and
a long-length packet transmitter for transmitting a long packet having a length equal to an integral multiple of the length of said cell, wherein said cell identifier identifies different cells of said long packet with respective cell identifiers, wherein said fixed-length packet receiver comprises:
a short-length packet receiver for assembling the cells identified by said cell identifier into said short packet; and
a long-length packet receiver for assembling the cells identified by said respective cell identifiers into said long packet.

9. An integrated communications system as claimed in claim 8, wherein said long packet comprises an integral multiple of the number of bits contained in said short packet.

10. An integrated communications system as claimed in claim 3, further comprising means for selecting one of said packet transmitters according to a predetermined priority algorithm and causing said cell formatting means to activate said selected one of said packet transmitters.

11. An integrated communications system as claimed in claim 3, wherein said cell formatting means continuously drives said transmit shift registers with clock pulses and drives said one of said packet transmitters with said clock pulses for said predetermined duration to transfer bits from the driven packet transmitter to said shift register.

* * * * *

UNITED STATES PATENT AND TRADEMARK OFFICE
CERTIFICATE OF CORRECTION

PATENT NO. :       5,007,045
DATED       :      April 9, 1991
INVENTOR(S) :      Kazuo TSUZUKI It is certified that error appears in the above-identified patent and that said Letters Patent is hereby corrected as shown below:

col. 4, line 12, after "368", insert --¥--.

col. 5, line 48, delete "date #-3 of the,", and insert --data #2-3 of the--.

Signed and Sealed this

Thirteenth Day of October, 1992

Attest:

DOUGLAS B. COMER

Attesting Officer          Acting Commissioner of Patents and Trademarks